UNITED STATES PATENT OFFICE.

EMILE F. KICK, OF NEW YORK, N. Y., ASSIGNOR TO AMERICAN CHEMICAL PRODUCTS COMPANY, A CORPORATION OF NEW YORK.

PROCESS FOR PURING HIDES AND SKINS.

No. 820,648.      Specification of Letters Patent.      Patented May 15, 1906.

Application filed August 16, 1904. Serial No. 220,957.

*To all whom it may concern:*

Be it known that I, EMILE F. KICK, a citizen of the United States, residing at No. 7 Second Place, city of New York, borough of Brooklyn, State of New York, have invented a new and useful Improvement in Processes for Puring Hides and Skins, of which the following is a specification.

This invention relates to a new process for freeing from lime, softening, purifying, and swelling hides and skins after they have been removed from the lime-vat and have passed the depilating stage. By my process they are especially fitted to receive and absorb the tanning materials subsequently employed by the tanner in the various processes of tanning.

My process consists in subjecting the limed hides or skins to the action of a bath consisting of a mixture of neutralized sulfoleic acids, such as sulforicinoleate of sodium (known in the textile art, commonly, as "turkey-red oil," "alizarin assistant," "Para-oil," "soluble oil," &c.) with sal-ammoniac or ammonium chlorid, ($NH_4Cl$.) Instead of ammonium chlorid ammonium acetate, ammonium nitrate, ammonium sulfate, or a mixture of them, may be employed.

The following equation represents the reactions between ammonium chlorid, the lime in the skins or hides, and the sulforicinoleate of sodium:

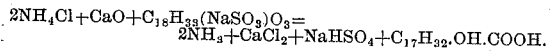

The following equation represents the reactions between ammonium acetate, the lime in the hides or skins, and the sulforicinoleate of sodium:

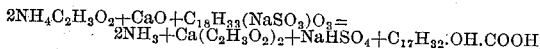

The following equation represents the reactions between ammonium nitrate, the lime in the hides or skins, and the sulforicinoleate of sodium:

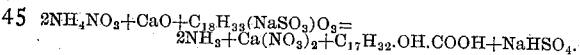

The following equation represents the reactions between ammonium sulfate, the lime in the hides or skins, and the sulforicinoleate of sodium:

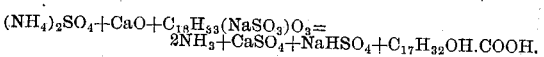

Thus the lime in said hides or skins is converted into soluble salts of chlorid, acetate, nitrate or sulfate of calcium, at the same time decomposing the sulfoleic acid or the sulforicinoleic-acid salt, or sulfoleate, or sulforicinoleate, forming calcium chlorid, calcium nitrate, calcium acetate, or calcium chlorid and free fat acid, which fat acid is nearly all absorbed by the hides or skins, thus filling the interstitial cells of the hides or skins previously occupied by the lime, and soft, porous, swelled, and purified hides or skins result, well adapted to absorb the tanning material subsequently employed.

By "neutralized" sulfoleic acid and sulforicinoleic acid, hereinbefore mentioned, I mean products resulting from the treatment of non-drying vegetable oils or fats, sometimes called "triglycerids," such as castor-oil, cotton-seed oil, arachis (peanut) oil, corn-oil, &c., with strong sulfuric acid, which products after being washed to free them from free sulfuric acid are finally neutralized with potassium or sodium hydrate or ammonia, by which means sulfoleates of the bases potassium, sodium, or ammonium are produced.

A general formula answering my purpose may be used as follows: one hundred parts, by weight, of castor-oil; thirty to fifty parts, by weight, of sulfuric acid, 66° Baumé. Agitate thoroughly in a lead-lined vessel and let stand over night. Then draw off the subnatant liquor, which contains the excess of sulfuric acid, and wash the sulforicinoleic acid which floats on the top with a saturated solution of brine, sodium chlorid, (NaCl,) or a saturated solution of Glauber-salt, sodium sulfate, ($Na_2SO_4$.) Wash twice with either of these saturated solutions and nearly neutralize the ricinoleic acid with sodium hydrate, (NaHO,) then completely neutralize with ammonia, ($NH_3$).

In the above formula for castor-oil may be substituted olive-oil, corn-oil, cotton-seed oil, arachis (peanut) oil, &c., in the same quantity with similar effect. The resulting product should show a slightly-alkaline reaction and should be soluble in water without the appearance of grease floating on the top and if not perfectly clear should show at least a perfectly clear emulsion that will not separate when diluted with hot water on standing awhile.

The object of my invention is to free from lime, purify, cleanse, soften, and swell the hides and skins by the employment and use of vegetable oil and a chemical salt, thus entirely dispensing with the use of dung and manures, glutens, and drench-baths of bran, &c., as at present employed in the tanneries for "puring" and "bating" hides and skins. "Pures" and "bates" as now employed are mostly of a fermentative nature, and therefore destructive to the grain and gelatinous fiber of the hides and skins.

By my process of treating the hides and skins with a bath composed of sodium sulfoleate or sodium sulforicinoleate and ammonium chlorid (sal-ammoniac) or its equivalents—ammonium acetate, ammonium nitrate, or ammonium sulfate—I rapidly effect the withdrawal of the lime and leave the hides or skins in the best possible condition for the subsequent tanning treatments at great saving both in time and labor, and the hides and skins are superior in strength and quality to those treated by the dung-fermentation processes.

In carrying out my process I will describe the methods generally practiced preliminarily to introducing the limed hides or skins into the pure or bate bath. The hides or skins are thoroughly wet down—that is, soaked in water until wet through. Then they are placed in lime-vats containing lime in solution and limed to loosen the hair and remain there for a number of days until in a condition to be unhaired. They are then depilated. After this process they are usually "fleshed"—that is, any adhering flesh on the flesh side of the hides or skins is removed. The limed hides or skins are then thoroughly washed in water in a paddle-vat or revolving mill to remove any loose lime, hair, of foreign matter that may cling to the exterior of the hides or skins. After this wash the limed hides or skins are "ready" to be introduced into the pure or bate bath to be freed from lime, softened, swelled, purified, and made ready for the subsequent tanning operations. When the hides or skins have arrived at this stage of customary preparation, instead of using dung, (such as dog or poultry manure,) as is usually employed to prepare a pure or bate liquor, I now proceed to introduce the said limed hides or skins into my pure or bate bath composed of a mixture of sulfoleate of sodium, potassium, or ammonium, preferably the sulforicinoleate of sodium, and an ammonium salt, preferably the chlorid of ammonium, (sal-ammoniac.)

In practice I proceed to prepare my pure or bate bath as follows: For two thousand pounds of limed hides or skins I use a vat or a semicylindrical vat or a revolving mill, such as is commonly employed by tanners, and run into it approximately about seven hundred and fifty gallons of water, to which I add twenty pounds of sulforicinoleate of sodium and ten pounds of chlorid of ammonium, (sal-ammoniac.) I then raise the temperature of the bath to about 105° to 115° Fahrenheit and introduce the limed hides or skins.

In practice I find that about one per cent. of the weight of the hides or skins of sulforicinoleate of sodium (known in the textile art as "turkey-red oil," "soluble oil," "alizarin assistant," &c.) mixed with about one-half of one per cent. of the weight of the hides or skins of ammonium chlorid when diluted with water enough to just about cover the hides or skins and raised to a temperature of about 105° to 115° Fahrenheit will rapidly effect the decomposition and conversion of the lime contained in the said hides or skins into soluble lime solution, (calcium chlorid.) Coincidently the fat acid of the sulforicinoleate of sodium is set free and is absorbed in such a manner by the hides or skins as to swell and make them porous and at the same time neutralize any adhering lime that may remain in the cellular tissues that may not have been acted upon by the free ammonium chlorid in the bath. After the limed hides or skins have been introduced into my pure or bate bath they must be worked—that is, paddled in the open wooden semicylindrical vat or revolving mill in the usual manner by mechanical power for about one hour, although a longer period will not affect the integrity of the hides or skins.

Generally the hides or skins are kept working in the paddle-vat or revolving mill continuously until they show a low or debilitated condition—that is, a soft rag-like condition—readily recognized by the experienced tanner. Ordinarily this debilitated or reduced condition is acquired in less than an hour by my process, though longer time may be required on account of extra thickness of the hides or skins or an excess of lime contained therein. By the old process of treating the hides or skins with the dung pure or bate generally twenty-four hours and often even a longer period is required to entirely free them from lime. The strength and value of the hides and skins are endangered in the old dung pure or bate process by the fermentative action set up by the acid generated in the dung on the gelatinous plasma constituting the fibro structural composition of the hides and skins, whereas by my process no fermentation takes place in the hides or skins, and the integrity of the fiber is preserved and safeguarded by the presence of the liberated fat acid set free in the bath while the solution of the lime is being effected by the ammonium salt.

In my process after the introduction of the hides or skins into the bath containing the mixture of sulfoleate or sulforicinoleate of sodium and ammonium chlorid, as hereinbefore mentioned, the supernatant liquor should show a strong alkaline reaction, due to the decomposition of the ammonium chlorid by the calcium oxid in the hides or skins and the subsequent liberation of ammonia from the ammonium chlorid while it is being converted into calcium chlorid. This reaction may be readily noted either by the smell of free ammoniacal gas or by red litmus-paper turning to blue.

It is not necessary to treat the hides or skins at the exact temperature of 105° to 115° Fahrenheit to free them from lime. They may be treated with a mixture of a cold solution of the sulfoleate or sulforicinoleate of sodium and ammonium chlorid with equal effect; but a longer duration of time is required. To expedite the process, 105° to 115° Fahrenheit has been found to be a desirable working temperature.

When the hides or skins are sufficiently reduced and show a low debilitated condition free from lime, they will naturally have a strong alkaline reaction to litmus-paper, due to the presence of ammonia in solution.

It is customary to wash the hides or skins to a neutral condition; but I find in practice that it is not necessary to wash them, and they may be introduced into the tanning liquors immediately after being purified by my process.

My pure or bate bath need not be thrown away after the hides or skins have been pured, as is usually practiced with the dung pure or bate baths, but can be kept in continuous use. Less material is required proportionately as the bath increases in age and strength.

It will be seen from the foregoing description that in carrying my invention into further effect I am not confined to the use of castor-oil as a basis for forming the sulfoleate salt required to form the soluble oil to be used in combination with ammonium chlorid or its equivalents—ammonium acetate, ammonium nitrate, or ammonium sulfate—in the treatment for freeing the hides and skins from lime. By experiment I have found that by treating the several oils, fats, otherwise known as "triglycerids," of the general formula: $(C_3H_5(O.R)_3$ with twenty-five to fifty per cent. sulfuric acid 66° Baumé, washing, and neutralizing with sodium hydrate or potassium hydrate or ammonium hydrate I obtain analogous sulfoleates which have the property when dissolved or emulsified with water in the presence of ammonium chlorid or its equivalents of breaking up into the original normal fat acids, said fat acids being absorbed by the hides or skins in the same manner as by the conversion of sulforicinoleate of sodium into ricinoleic acid in the presence of ammonium chlorid and hides or skins containing free lime.

My experiments have included those fats or oils known as "non-drying" oils—viz., castor-oil, cotton-seed oil, olive-oil, arachis (peanut) oil, corn-oil, &c.

This process can be used for freeing from lime and for purifying, cleansing, and swelling hides and skins of every description, the hides and skins retaining their natural fiber and strength, and after passing through the subsequent tanning operations the resultant leather is stronger and superior in quality to that "pured" or "bated" by the duno fermentation processes.

Having thus described my invention, what I desire to claim and secure by Letters Patent is—

1. The within-described process for removing the lime from limed hides or skins, at the same time purifying, cleansing, swelling, and softening the said hides or skins, said process consisting in subjecting the limed hides or skins to the action of a soluble salt of a sulfoleate, either sodium, potassium or ammonium, or a mixture of them, in combination with an ammonium salt, or a mixture of ammonium salts, substantially as herein set forth.

2. The within-described process for removing the lime from limed hides or skins, at the same time purifying, cleansing, swelling and softening the said hides or skins, said process consisting in subjecting the limed hides or skins to the action of a soluble salt of sulforicinoleate of sodium, in combination with chlorid of ammonium, substantially as herein set forth.

In testimony whereof I, EMILE F. KICK, have signed my name to this specification, in the presence of two subscribing witnesses, this 15th day of August, 1904.

EMILE F. KICK.

Witnesses:
  MICHAEL H. CURRAN,
  JOHN O. CHRYSTAL.